(12) United States Patent
Hunacek et al.

(10) Patent No.: US 9,571,899 B2
(45) Date of Patent: Feb. 14, 2017

(54) METHOD FOR WATERMARKING MEDIA CONTENT AND SYSTEM FOR IMPLEMENTING THIS METHOD

(71) Applicant: NAGRAVISION S.A., Cheseaux-sur-Lausanne (CH)

(72) Inventors: Didier Hunacek, Blonay (CH); Patrick Servet, Cheseaux-sur-Lausanne (CH); Marco Macchetti, Cheseaux-sur-Lausanne (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 14/786,917

(22) PCT Filed: Apr. 11, 2014

(86) PCT No.: PCT/EP2014/057331
§ 371 (c)(1),
(2) Date: Oct. 23, 2015

(87) PCT Pub. No.: WO2014/173697
PCT Pub. Date: Oct. 30, 2014

(65) Prior Publication Data
US 2016/0088366 A1 Mar. 24, 2016

(30) Foreign Application Priority Data
Apr. 26, 2013 (EP) .................................... 13165496

(51) Int. Cl.
*H04N 7/167* (2011.01)
*H04N 21/8358* (2011.01)
(Continued)

(52) U.S. Cl.
CPC ...... *H04N 21/8358* (2013.01); *H04N 21/4181* (2013.01); *H04N 21/4405* (2013.01); *H04N 21/63345* (2013.01); *H04N 21/8355* (2013.01)

(58) Field of Classification Search
CPC ............ H04N 21/8358; H04N 21/4181; H04N 21/4405; H04N 21/63345; H04N 21/8355
See application file for complete search history.

(56) References Cited

U.S. PATENT DOCUMENTS 8,336,106 B2 12/2012 Le Buhan et al.
8,571,213 B2 10/2013 Tran et al.
(Continued)

FOREIGN PATENT DOCUMENTS

EP 1 968 316 9/2008
EP 2 391 125 11/2011
(Continued)

OTHER PUBLICATIONS

International Search Report issued in International Application No. PCT/EP2014/058628 dated Aug. 21, 2014.
(Continued)

*Primary Examiner* — Oleg Asanbayev
(74) *Attorney, Agent, or Firm* — DLA Piper LLP (US)

(57) ABSTRACT

A method for watermarking digital media content received in a form of at least one encrypted sample to which metadata is assigned. Each sample is encrypted by means of a sample key. The metadata comprises first data, second data and a signature resulting from the first and second data. The first data is encrypted by a transport key and comprises at least a content key and watermarking metadata. The second data comprises an initialization vector so that the content key and the initialization vector form a unique pair of cryptographic data equivalent to the sample key. The method comprises the steps of extracting the metadata from the media content, decrypting the first data by using the transport key, authenticating the signed data and, in case of positive outcome,
(Continued)

descrambling each sample by using the pair of cryptographic data, and marking each descrambled sample by using the watermarking metadata.

16 Claims, 2 Drawing Sheets

(51) Int. Cl.
*H04N 21/4405* (2011.01)
*H04N 21/6334* (2011.01)
*H04N 21/8355* (2011.01)
*H04N 21/418* (2011.01)

(56) References Cited

U.S. PATENT DOCUMENTS

| | | | |
|---|---|---|---|
| 8,861,729 B2 | 10/2014 | Folea et al. | |
| 2002/0146123 A1* | 10/2002 | Tian | G06F 21/10 380/234 |
| 2002/0186844 A1* | 12/2002 | Levy | G06F 17/30017 380/231 |
| 2003/0103645 A1* | 6/2003 | Levy | G06F 17/30876 382/100 |
| 2003/0112974 A1 | 6/2003 | Levy | |
| 2004/0098603 A1 | 5/2004 | Corinne | |
| 2008/0219643 A1 | 9/2008 | Le Buhan et al. | |
| 2010/0070991 A1* | 3/2010 | Kaag | H04L 63/0853 725/31 |
| 2010/0128871 A1 | 5/2010 | Folea et al. | |
| 2010/0208891 A1 | 8/2010 | Folea et al. | |
| 2011/0293092 A1 | 12/2011 | Tran et al. | |
| 2012/0114118 A1 | 5/2012 | Verma | |
| 2014/0040623 A1 | 2/2014 | Conus et al. | |
| 2014/0086408 A1* | 3/2014 | Bickmore | H04N 21/42684 380/210 |

FOREIGN PATENT DOCUMENTS

| | | |
|---|---|---|
| WO | WO 2009/144111 | 12/2009 |
| WO | WO 2012/143880 | 10/2012 |

OTHER PUBLICATIONS

Written Opinion issued in International Application No. PCT/EP2014/058628 dated Aug. 21, 2014.
International Search Report issued in International Application No. PCT/EP2014/057342 dated Aug. 21, 2014.
Written Opinion issued in International Application No. PCT/EP2014/057342 dated Aug. 21, 2014.
International Search Report issued in International Application No. PCT/EP2014/057331 dated Aug. 21, 2014.
Written Opinion issued in International Application No. PCT/EP2014/057331 dated Aug. 21, 2014.
File History of U.S. Appl. No. 14/786,905.
File History of U.S. Appl. No. 14/786,913.

* cited by examiner

METHOD FOR WATERMARKING MEDIA CONTENT AND SYSTEM FOR IMPLEMENTING THIS METHOD

CROSS REFERENCE TO RELATED APPLICATIONS

This application is a U.S. National Stage Application of International Application No. PCT/EP2014057331 filed Apr.11, 2014, which claims priority from European Patent Application No. 13165496.4 filed Apr. 26, 2013.

TECHNICAL FIELD

The present invention relates to the field of watermarking for adding digital watermark to media content such as digital images, audio data or audio/video data stream. More particularly, the invention refers to a scrambled/encrypted content received by a processing device, such as a set-top-box in the pay TV domain, which has to add copyright information onto the related descrambled content.

BACKGROUND

In the pay media environment such as a pay television system, multimedia content sent to digital media players is provided in an encrypted form (i.e. a scrambled form), in order to provide a restricted access. Accordingly, only subscribers who have paid for the right to descramble such content receive suitable decryption keys for retrieving the content in its clear form. However, once descrambled, the content is subject to any fraudulent copies which can then be transmitted in its clear form to anybody without the ability to determine who is the owner or the authorized user of this content.

A known technique aiming to prevent or deter unauthorized copying of digital content, and thereby preserve the copyrights attached to this content, is the digital watermarking process. Watermarking is the process of embedding information into a digital signal which may be used to verify its authenticity or the identity of its owners, similarly as paper bearing a watermark for visible identification. If the signal is copied, then information relating to the watermark is also carried in the copy. There are generally two classes of digital watermarks: the visible watermarks and the invisible watermarks. Multimedia content such as TV programs, downloadable movies or audio/video data provided by streaming will preferably include invisible watermarks for obvious purposes.

In the particular case of the set-top box domain, the content (e.g. video and audio) is secured by a key generated by a Conditional Access System (CAS). Both the encrypted content and metadata comprising an encrypted decryption key are broadcasted or are available to subscribers, for instance through Dynamic Adaptive Streaming over HTTP (DASH).

The DASH is an enabler which provides formats to enable efficient and high quality delivery of streaming services over the Internet. Media content of these services are delivered from conventional HTTP web servers. The DASH is based on the standard "ISO base media file format" (ISO BMFF). Files conforming to the ISO BMFF are formed as a series of objects, called "boxes". Referring to this standard, the content could be encrypted using either Advanced Encryption Standard (AES) Counter (CTR) mode or AES Cipherblock Chaining (CBC) mode. These two modes require Initialization Vector (IV) to encrypt the content.

The decryption process is performed at the user end by a Conditional Access Module (CAM). After this operation, the content is generally marked by application software of the user device (e.g. a set-top-box) by using watermarking metadata. Such metadata comprising typically information about where the watermark has to be embedded and which data has to be used as watermark. This means that the unprotected content and the watermarking metadata are exposed to such application software. Therefore the enforcement of the marking depends on the security of the software running on the user device. If this device is successfully attacked or just open (no software authentication), it is easier to bypass/modify the marking of the media content. Besides, it should be noted that, upon request, the application software is also able to perform any decryption process if it is provided with a decryption key. Generally, the initialization vector and the encrypted form of the decryption key are accessible by the application software. Therefore the application software would be able to perform the decryption of the media content and finally to have access to the unprotected content.

Taking in account that such application software is untrusted and that it may have access to the unprotected content, an attack on the watermarking process is still possible.

Therefore, there is a need to provide an efficient solution to secure the watermarking process performed onto unprotected media content which is received in an encrypted form by application software to add a digital watermark thereon.

Document EP 2 391 125 A1 relates to a method for embedding the tracing secret data into multimedia contents delivered to particular users. To this end, this document is focused on marking the data outputted by a security module in charge of the security operations for a descrambler unit. The aim is to produce a marked stream between the security module and the descrambling unit embodying some values representative of the security module having produced this stream of data. The data transmitted to the descrambling unit refers to post-marked correction data allowing calculation of reconstruction values so as to obtain a unique reconstructed marked video stream from a modified video stream and said correction data.

Document US 2010/0208891 A1 discloses a process to perform a personalized marking of an audiovisual sequence which can be securely distributed by broadcasting means. To this end, this document suggests sending to all of the receiver facilities unique information comprising a modified stream and a complementary stream. The reconstructed stream differs from the original stream by the fact that it comprises a first mark applied by a first watermarking step at the server. This first mark is preferably troublesome for the user. The complementary stream comprises watermarked data belonging to the marked audiovisual stream. A second mark is generated by the audiovisual decoder of the receiver and is used as personalization identifier for marking the reconstructed stream.

SUMMARY OF THE INVENTION

In order to solve the above-mentioned problems, the present invention suggests a method for watermarking digital media content received through a first interface by application software running within a user device, typically a computing unit such as a set-top-box or any other kind of decoder. The digital media content is received in a form of at least one encrypted sample (i.e. a piece of content which can be a content packet). The digital media content is related to metadata assigned to the samples, preferably to each sample. To this end, the metadata may comprise information allowing to identify the sample to which this metadata refer. This relation between sample and related metadata could be also obtained by a specific arrangement of such data within a data stream or could be obtained by a synchronization process. Each sample is encrypted by means of a sample key.

The metadata comprises at least first data, second data and a digital signature resulting from the signature of the first and second data. The first data comprises at least the content key and watermarking metadata. Preferably, the first data also comprises key metadata relating to the content key. At least the first data is encrypted by at least one transport key. The content key is used as first input in a cryptographic process. The second data comprises at least an initialization vector. This initialization vector is used as second input in the cryptographic process, so that the content key and the initialization vector allow to retrieve the sample key for encrypting/decrypting each sample of the digital media content.

According to the invention, the application software is able to communicate through a second interface with a secure environment in charge of handling the metadata, of decrypting encrypted data and of watermarking the media content if required. Accordingly, the application software is not allowed to process data contained within the metadata. The secure environment is able to extract the transport key from a secure memory or to derive the transport key (by calculation) from a secret key stored in a secure memory of the secure environment.

The watermarking of the digital media content is performed by the following steps:
  instructing the application software to get the metadata (e.g. by extracting it from the digital media content or from another source) and to transmit the metadata to the secure environment (without decrypting the first data),
  decrypting at least a part of the first data within the secure environment by means of the transport key to retrieve at least the content key in an intelligible form,
  verifying, by the secure environment, the authentication of the digitally signed first and second data,
  in the case where the authentication step provides a positive outcome (i.e. if the signed second data are authentic), then transmitting at least the watermarking metadata to a watermarking unit and transmitting the digital media content, the content key and the initialization vector to a descrambler for descrambling each sample by means of the sample key,
  transmitting each descrambled sample to the watermarking unit for digitally marking it by means of at least said watermarking metadata,
  outputting the processed sample from the secure environment through the second interface in view to be played by a rendering device.

The present invention also refers to a system for watermarking digital media content in accordance with the above-mentioned method. This system comprises a computing unit for running the application software into which each encrypted sample and its assigned metadata is input in an application software through the first input interface. The media content comprises at least the samples. According to the invention, the system also comprises a secure environment able to communicate with the application software through the second interface. This secure environment comprises the following components:

a secure memory for storing one transport key or at least one secret key for retrieving said transport key,
  a cryptographic unit for decrypting said first data by means of the transport key(s),
  an authentication unit for authenticating the signed second data,
  a descrambler for descrambling each sample by means of the pair of cryptographic data used as input data in a cryptographic process within the cryptographic unit, this cryptographic data comprising the content key included in the first data and an initialization vector included in the second data,
  a watermarking unit for digitally marking each sample with watermarking metadata comprised in the first data.

Besides and still in accordance with the present invention, application software is configured to extract the metadata from the digital media content before transmitting the metadata to the secure environment for processing. Alternatively, the metadata could be also extracted from a playlist/media presentation description, so that the metadata themselves can then be downloaded separately from the content data. The second interface is further used for outputting the descrambled sample from the secure environment in view to be played by a rendering device.

Accordingly, each sample can be descrambled then watermarked within a trustworthy secure environment which can be controlled by the conditional access system provider. Indeed, thanks to the present invention the watermarking process is a secure process that cannot be bypassed or be changed by a malicious person, for instance by tampering the watermarking metadata in view to change the watermark embedded in the descrambled sample provided by the application software. Thanks to the encryption of said first data, the content key is bound with the watermarking metadata and thanks to the signature involving the first and second data, the watermarking metadata is bound with the initialization vector.

Other advantages and embodiments will be presented in the following detailed description.

BRIEF DESCRIPTION OF THE DRAWINGS

The present invention will be better understood thanks to the attached figures in which.

DETAILED DESCRIPTION

Figure 1:
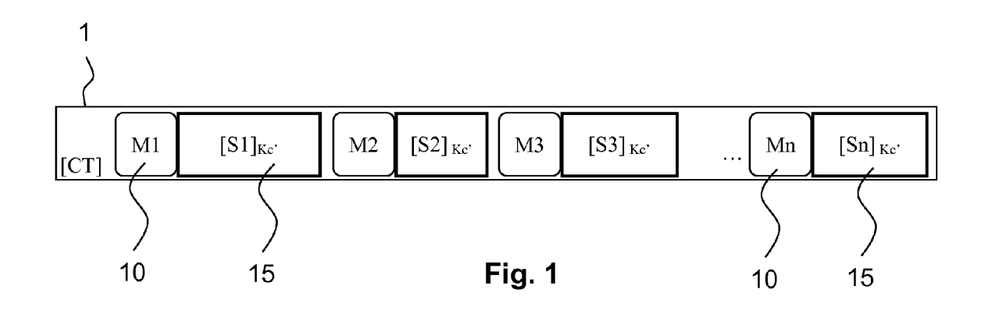
FIG. 1 schematically shows the general structure of the digital media content processed in the present invention as input data,
  FIG. 2 schematically shows the data included in metadata assigned to the samples contained in the digital media content.

Referring to FIG. 1, the latter schematically shows one embodiment of the digital media content 1 processed as input data in the present invention. The digital media content comprises at least one encrypted sample 15 and the media content is related to metadata 10 assigned or associated to the sample(s), preferably to each sample.

In one embodiment, the digital media content includes said metadata, as shown in FIG. 1.

This media content 1 can refer to any kind of multimedia content such as audio and/or video content or a content comprising still image(s) and/or text data, or even a mixed of such information (data). Preferably, the digital media content will refer to a stream of multimedia content. As this content can be a heavy content, it is segmented into packets (or into portions or pieces of content) defined as being samples of content in the present invention. In some particular cases, the media content may comprise one sample only. However, most of the time the media content comprises a plurality of samples 15 (S1, S2, S3, . . . Sn), as shown in FIG. 1.

The digital media content 1 can be made of a single stream (as shown in FIG. 1), or it can be made of a plurality of streams synchronized between them. For instance, one of these streams can for instance comprise video data while another stream may comprise the related audio data or the related metadata. Alternatively, a first stream can comprise audio/video data and a second stream (synchronized with the first stream) can comprise related metadata 10. Besides, the stream containing the samples 15 (i.e. the content to be played by the end user device) can be provided by a first content source, while metadata 10 can be provided by another source, namely a second source distinct from the content source (e.g. playlist). In any cases, metadata must be processed in synchronism with the related samples.

The samples 15 do not need to comprise a constant number of bytes and therefore do not need to have all the same size. By knowing successively the relevant size of each sample it becomes possible to retrieve each of them. Accordingly, the size of each sample 15 can be defined by size information SZ (FIG. 2) and used for this purpose in accordance to a preferred embodiment. However, the sample can be retrieved from the stream by another manner, for instance by means of markers or other data comprised in headers. Besides, in the case where all the samples have the same size, clock information could be also uses to the same purpose.

FIG. 1 also shows that metadata M1, M2, M3, . . . Mn are respectively assigned (e.g. associated) with each sample S1, S2, S3, . . . Sn, so as to form a plurality of pairs of data (metadata 10; sample 15). In the case where the media content is a single stream comprising both samples and metadata, each metadata 10 is preferably located just before its relevant sample 15 into the content data stream 1, so that each metadata can be handled first (i.e. before its sample). Preferably, each metadata is specific to the sample to which it is assigned. However, in some particular cases several samples could be provided with the same metadata. In another case, one metadata 10 can be shared by a plurality of samples 15 so that metadata could be inserted at regular intervals within the samples, for instance every ten or twenty samples.

The samples 15 of the media content 1 are initially encrypted by means of a sample key Kc' which can be different for a set of samples (even for each sample). This is illustrated in FIG. 1 by writing the identifiers S1 to Sn of the sample between brackets and by adding the Kc' index. Although the metadata are not globally encrypted (even it can include encrypted data), the digital media content 1 to be processed as input data in the present invention is noted [CT], as shown in FIG. 1 and in FIG. 3.

Figure 2:
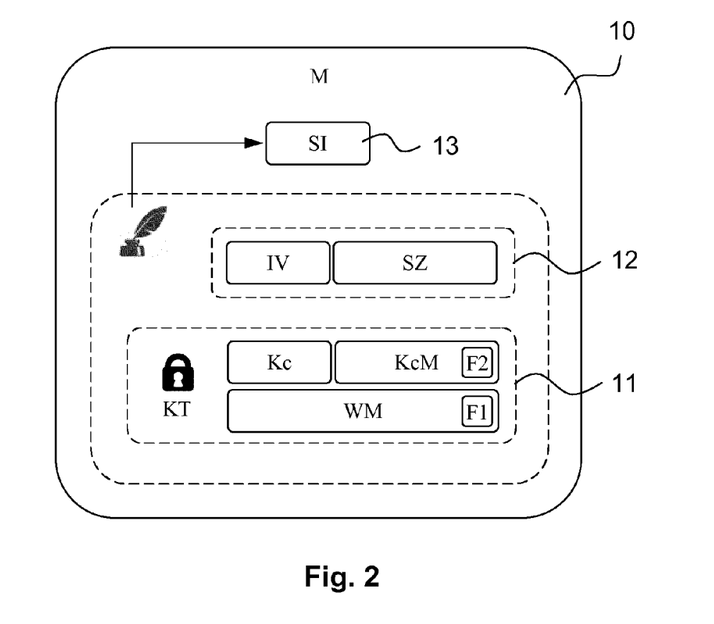

Referring now to FIG. 2, the latter shows, according to one embodiment, the main data included in metadata 10 and how this data are organized (grouped). Metadata 10 comprises first data 11, second data 12 and a digital signature 13. This signature is typically a digest provided e.g. from a hash function applied to the first and second data, in particular to at least some data of the so-called first data 11 (e.g. the content key Kc and watermarking metadata WM) and to at least some data of the so-called second data 12 (e.g. the initialization vector IV and size information SZ). Besides, the signature is preferably determined from non-encrypted data, i.e. the signature is calculated before the encryption of the data comprised in the so-called first data 11. Accordingly, the signature could be also encrypted and therefore be part of the first data 11. The function or the algorithm to provide this signature is kept secret, so that it remains unknown for the application software. Of course, the same function or the same algorithm is used for generating this signature (at the sender side) and for authenticating it (at the recipient side). The digitally signed data are schematically shown in FIG. 2 by the pictogram illustrating the inkwell and the feather assigned to the area surrounding the first and second data (see the largest dotted line).

The first data 11 refers to encrypted data, as shown by the pictogram illustrating a padlock. This first data comprises at least a content key Kc and watermarking data WM. The content key Kc is a global key required as first input of a cryptographic process for decrypting the encrypted samples. This cryptographic process is used in particular during the encryption (scrambling) of the samples by the content provider (e.g. by the head-end or by any other remote server) and during the decryption, typically at the user end (e.g. by a user computer, a set-top-box STB or any other computing device). The second input of this cryptographic process is provided by an initialization vector IV which will be described in more detail hereafter. The same content key Kc could be used for encrypting all the samples broadcasted in the media content 1 or provided by any other means to several end users (e.g. subscribers). However and in accordance with the preferred embodiment, the content key Kc varies within the data stream 1 in order to define so-called crypto-periods. Accordingly, several samples are comprised in one crypto-period and these samples are encrypted with the same content key Kc. But, different content keys Kc are used during successive crypto-periods, in particular during each crypto-period.

Watermarking metadata WM includes the main data and information for watermarking the samples, preferably for watermarking each sample of the media content. For instance, watermarking metadata comprises at least part of the data to be embedded into the sample as watermark and information stating where the watermark must be embedded within the sample, namely at which location. This location could be defined e.g. by coordinates or by providing the relative offset of the block to be watermarked (the sample being formed by a plurality of data blocks).

In one embodiment, the watermarking metadata can comprise common pre-watermarking data, namely data which are identical in several watermarking metadata and which will be used for watermarking several samples. Pre-watermarking data could be in the form of a record containing an address of the block to be marked and at least one alternate value. At the client device, in particular in a secure environment, each record is processed and the alternate value is selected (or not selected) according to each bit of a unique identifier pertaining to the secure environment (and stored in the latter) or according to each bit of an identification to be included into the metadata.

The first data 11 is encrypted by at least one transport key KT. It means that all data comprised in the so-called first data are encrypted by the same key KT or by several different keys. For instance, the content key Kc could be encrypted by the transport key KT and the watermarking data WM could be encrypted by a second transport key KT' distinct from the first above-mentioned transport key KT.

The second data 12 comprises the initialization vector IV and preferably size information SZ. The initialization vector IV is used as second input in the above-mentioned cryptographic process, so that the content key Kc and the initialization vector IV form together a unique pair of cryptographic data (Kc, IV) for encrypting/decrypting each sample 15 of said digital media content 1. Accordingly, the initialization vector changes from one sample to another. As the pair of cryptographic data Kc, IV comprises data used for encryption/decryption, this pair forms the so-called sample key Kc'. In other words, this unique pair of cryptographic data (Kc, IV) is equivalent to the sample key Kc'.

The cryptographic process used to scramble (i.e. to encrypt) the samples 15 can refer to any cryptographic algorithm involving an initialization vector. Accordingly, this algorithm can refer to Advanced Encryption Standard (AES) Counter (CTR) mode or a Cipher Block Chaining (CBC) encryption mode such as AES CBC or TDES CBC. In these modes (other modes could be also used), an initialization vector is used as supplementary input, in addition to the encryption key. Therefore, the initialization vector can be seen as a parameter used for altering the encryption key. Typically, this initialization vector is a numerical value used in combination with the base encryption key before the first step of the encrypting content process. Initialization vectors are often used to prevent a sequence of data that is identical to a previous sequence from producing the same result when encrypted. Thus, the use of initialization vectors is fully suitable for encrypting data such as content packets resulting from packetized events or programs to be broadcast. Contrary to the content key Kc, the initialization vector does not need to remain secret.

Advantageously, the watermarking data WM and the initialization vector IV are bound together by the signature 13. Besides, the watermarking data WM and the content key Kc are also bound together by the signature.

Figure 3:
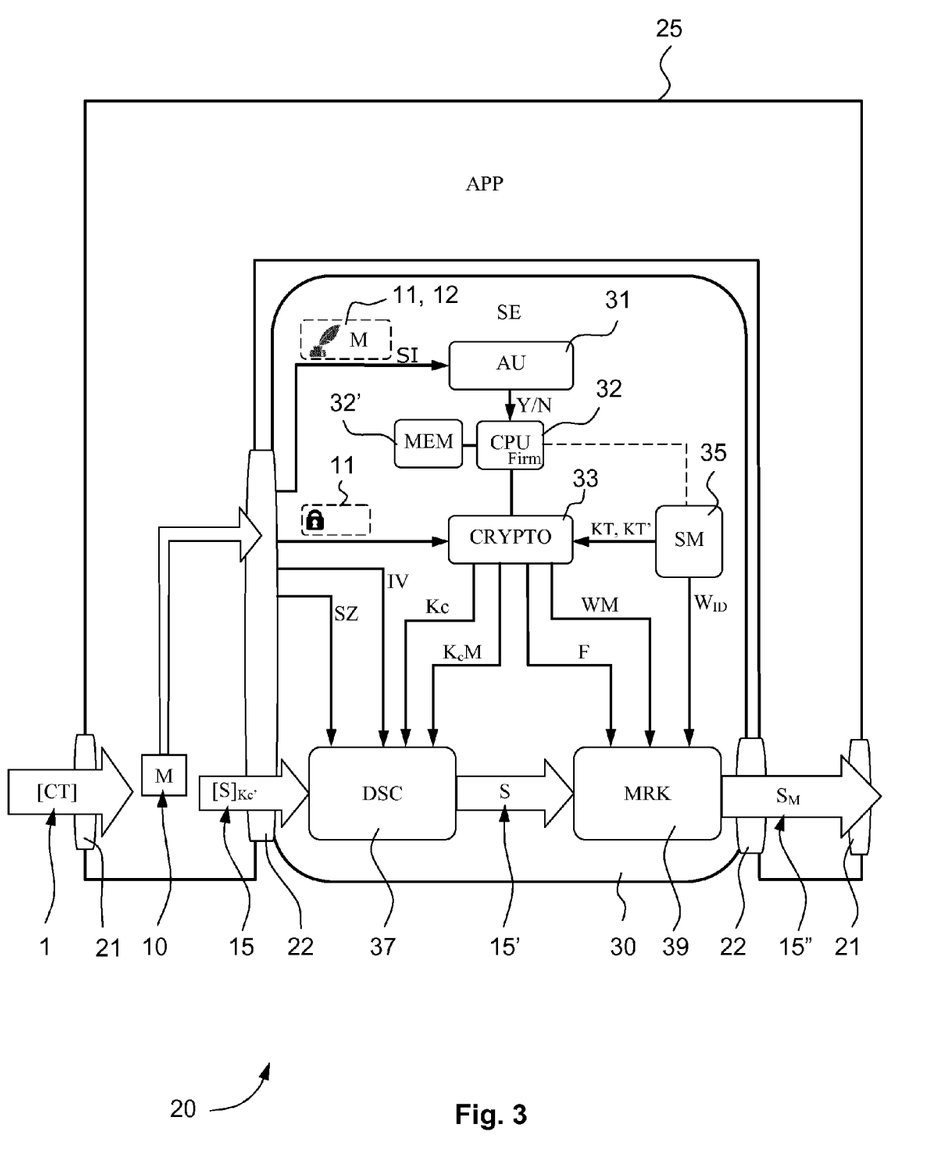
FIG. 3 depicts an overview of the system of the present invention.

FIG. 3 depicts an overview of the system 20 used for watermarking the digital media content 1 in accordance with the present invention. This Figure is now mainly used to continue the description of the method, and then it will be also used to present the system 20 for implementing this method.

According to the invention, the digital media content 1 (shown in FIG. 1) is received through a first interface 21 by application software APP. As already mentioned, the digital media content comprises at least one encrypted sample 15 and it is related to metadata 10 assigned preferably to each sample 15. Accordingly, metadata 10 can be included within the media content 1 (as shown in FIG. 1) or can be supplied to the application software APP via another channel, namely another source such as a remote server. In the case where metadata and samples are provided by two different channels, metadata and samples must be synchronized to each other. Synchronization can be done during the emitting of the data (e.g. at the head-end), during the reception by the application software, within this application software or even within the secure environment before processing this data. In the embodiment shown in FIG. 1, the synchronization between the samples and the related metadata 10 is implicit given that it is provided by the arrangement of this data in the content stream 1.

Besides, it should be also noted that some data of the metadata 10, such as the so-called second data 12 and in particular the initialization vector IV, could be received by the application software APP separately from the other data of the metadata 10, namely by a different channel. Once again, in this case, data provided by another channel must be processed in synchronism with any other input data (i.e. the other data of the metadata 10 and the samples 15). For the sake of simplicity, one considers in the following description that the metadata relating to a sample 15 are comprised in the same packet 10, and that the metadata 10 and the samples 15 are arranged in the media content 1 as illustrated in FIG. 1.

The application software APP can run e.g. within a user device, typically a computing unit such as a set-top-box or any other kind of decoder. Alternatively, application software could be remotely accessed, for instance through a media path, and could be hosted by a remote server. More particularly, the media content 1 is received through the input port (shown on the left side of FIG. 3) of this first interface 21, in a form of at least one encrypted sample 15. Application software APP is able to communicate, through a second interface 22, with a secure environment 30 (SE). This secure environment is in charge of handling the metadata 10. Therefore and in accordance with the invention, the application software APP is not allowed to successfully process the data comprised in the so-called metadata 10. Indeed, given that metadata 10 comprises at least some encrypted data (in particular sensitive data such as the content key and the watermarking metadata) requiring at least a secret key to be decrypted, and given that the metadata is further at least partly digitally signed with an signing algorithm (or function) which could be kept secret by the manufacturer, by the vendor or by the provider of the secure environment 30, therefore the application software is unable to successfully access to the sensitive data comprised in the metadata.

The watermarking of the digital media content 1 is performed by the following steps.

The first step refers to instruct the application software APP for extracting metadata 10, for example, from the digital media content 1, before transmitting the metadata to the secure environment 30. This can be done by successively identifying a metadata (e.g. by means of the detection of a header or any specific information) during the processing of the encrypted data stream, namely during the successive reading of each data contained in the stream. In addition and according to a preferred embodiment, one has taken care to introduce in advance a specific code (programming instructions) in an application layer of the application software (e.g. during an initialization step), to direct transmission of each metadata 10 (upon receipt) towards the secure environment through the second interface 22. Accordingly, the step aiming to instruct the application software APP to extract the metadata 10 from the digital media content 1 and to transmit the metadata to the secure environment 30 can be performed by modifying an application layer within a standard application software APP (i.e. a common APP).

Then, the next following steps are performed within the secure environment 30, until the currently processed sample 15 has been decrypted and watermarked, unless otherwise stated. To this end, the secure environment performs the decryption of at least a part of the first data 11 (i.e. at least some data of said first data 11, such as the content key Kc) by means of the cryptographic unit 33. This unit used the same cryptographic algorithm (or a paired algorithm) as that used during the encryption process. For the decryption, the cryptographic unit 33 will use the transport key(s) KT, KT' to retrieve at least the content key Kc and preferably the watermarking metadata WM comprised in the encrypted first data 11. If the first data has been encrypted with only one key (instead of two keys), the cryptographic unit needs to obtain only one so-called transport key KT. To this end, the secure environment is able either to extract the transport key(s) KT, KT' from a secure memory 35 or to derive said transport key(s) KT, KT' from a secret key Ks stored in the secure memory 35. Indeed, the so-called transport key(s) KT, KT' can for instance be calculated by a plurality of cryptographic modules which determine a plurality of keys by successive cryptographic operations until the final transport key(s) KT, KT' is obtained. Accordingly, the transport key KT, KT' can be derived from the secret key Ks stored in the secure memory.

The transport key(s) KT, KT' can be stored in the secure memory 35 during the manufacturing of the secure environment, or during its personalization for instance via a downloading process which can be performed during an initialization phase.

Thanks to the transport key(s) KT, KT', at least the content key Kc and the watermarking metadata WM (if required) can be retrieved in an intelligible form. If the same content key Kc is used for the decryption process of several samples within the same crypto-period, preferably the system will store (in a temporary memory) the content key Kc in its intelligible form during the entire crypto-period, thereby avoiding determining the content key Kc each time a sample is decrypted during this crypto-period.

Preferably, the first data 11 also comprises key metadata KcM as shown in FIG. 2. The key metadata is preferably encrypted by the same transport key KT as that used for encrypting the content key Kc. The key metadata KcM can refer to parameters relating to the utilization of the content key Kc. For instance, these parameters may inform a descrambler that the related content key has to be used for decrypting a stream (e.g. each sample 15) encrypted with AES CTR mode. In one embodiment, the key metadata KcM may comprise information that enforces the decryption of the samples with a particular cryptographic algorithm and chaining mode, such as AES CTR. The chaining mode is handled in the secure environment (in particular in the descrambler 37) and can not be modified by the application software APP. Other information, such as a flag, can be included in the key metadata as suggested hereafter. If key metadata KcM is present within the first data 11, then the key metadata KcM is decrypted and processed before the decryption of the watermarking metadata WM because the decryption of the watermarking metadata WM may depend on the state of the flag comprised in the key metadata KcM as explained hereafter.

Then, during the next step one proceeds with the verification of the authentication of the digitally signed first and second data. To this end, the digitally signed metadata is introduced together with the digital signature 13 (SI) into an authentication unit 31 comprising the secret function/algorithm for verifying the signature of the signed data. The verification is performed by calculating a second signature on the basis of the signed data received by the authentication unit 31 and by comparing this second signature with the original signature 13. If there is a match, then the metadata 10 is authentic, i.e. this metadata has not been tampered during the transmission from the sender to the recipient and are therefore identical to the original metadata of the sender. Further to this result, the authentication unit 31 can provide a message (noted Y/N as for Yes or No in FIG. 3) e.g. to a central processing unit 32 in order to inform the latter whether the metadata is authentic or not.

If the authentication unit 31 provides a negative message, preferably the system 20 will undertake countermeasures. For instance, the system 20 can stop any subsequent descrambling process for at least one crypto-period. In variant, the system can send an encrypted message, e.g. to the content provider or the authority managing the subscriptions, in order to inform this entity that this system 20 (identified e.g. by a unique identifier) has found tampered metadata. An intelligible message can also be sent to the attention of the end user, for instance towards the rendering device connected to the application software or to its host computing device.

On the contrary, if the authentication step provides a positive outcome, then the watermarking metadata WM is transmitted to a watermarking unit 39.

Then, the digital media content 1, the content key Kc and the initialization vector IV is transmitted to a descrambler 37 for descrambling each encrypted sample 15 by means of the sample key Kc'. The decryption of the encrypted sample is performed by means of the pair of cryptographic data (Kc, IV) used as input data in the cryptographic process within the descrambler 37.

In another embodiment, the transmission of the content key Kc and/or the initialization vector IV to the descrambler 37 can be performed only if the authentication step provides a positive outcome. In variant, the transmission of the digital media content 1 to the descrambler 37 can also depend on the outcome of the authentication step, so that the media content is transmitted only in case of positive outcome.

According to another embodiment, the decryption step performed by the cryptographic unit 33 could be performed after the authentication step. In this case, if the authentication step provides a negative outcome, the system 20 could be able to prevent at least the transmission of the content key Kc towards the descrambler 37.

According to the preferred embodiment, each sample can be retrieved (typically from the data stream) owing to size information SZ. Accordingly, size information is also input into the descrambler as shown in FIG. 3.

Once the sample 15 has been decrypted, the descrambled sample 15' is then input into the watermarking unit 39 for digitally marking it by means of the watermarking metadata WM which contains at least one watermark (marker) to embed within the descrambled sample 15'. Preferably, this watermark (or at least its location within the sample) changes from one sample to another.

According to a preferred embodiment, the watermarking unit 39 is supplied with a first additional input $W_{ID}$ referring to a complementary watermark, in particular to a unique watermark (like a unique stamp) which is specific to the secure environment 30 by including e.g. the unique identifier (ID) of this secure environment or a derived value. This identification watermark $W_{ID}$ allows to identify the secure environment 30 having processed the samples 15 and thus enable to identify the user device (e.g. STB) into which this secure environment is installed. As shown in FIG. 3, the identification watermark $W_{ID}$ can be e.g. stored in the secure memory 35 within the secure environment.

In variant, this identification watermark $W_{ID}$ could be obtained by processing pre-watermarking data together with the bits defining the unique identifier ID assigned to the secure environment 30. The pre-watermarking data could comprise at least one common watermark W and at least one record which could be represented by the following notation: $R_i = \{\#Adr_i; V_1/V_2\}$. Each record comprises a position or the address of the block which has to be marked (#Adr) and an alternate value, namely a bi-state value ($V_1/V_2$) which can be either $V_1$ or $V_2$. For instance, by having ID=01011 as identifier of the secure environment, and by having five records R1 to R5 (i.e. one record for each bit of the ID), the identification watermark $W_{ID}$ could be obtained by marking the sample with $V_1$ at position #$Adr_1$, $V_2$ at position #$Adr_2$, $V_1$ at position #$Adr_3$, $V_2$ at position #$Adr_4$ and $V_2$ at position #$Adr_5$.

According to another embodiment, the watermarking of the descrambled sample 15' may depend on the state of at least one flag F, so that the watermarking unit 39 can output watermarked samples 15" or descrambled samples 15' without any watermark. Indeed, the system 20 is able to control the watermarking unit 39 by providing information (via the flag F) stating either that the watermarking has to be done or that the watermarking must not be done. Accordingly, some descrambled sample 15' of the same media content can be watermarked while others remain without watermark. Alternatively, all of the descrambled samples 15' could remain without watermark. Thus, such information could be used for indicating to the watermarking unit that the entire data stream 1 must or must not be watermarked. In this case, a second flag could be also used for that purpose. The flag F may include a single bit, providing two states: 1 or 0, for defining if the watermark must be applied or not. For security reason, this flag could comprise more than one bit. The flag F is included in the metadata 10, preferably within first data 11.

According to the preferred embodiment, there are two flags F. The first flag F1 is used for controlling the watermarking of each descrambled sample 15', namely in an individual manner. Accordingly, the first flag F1 is comprised in the watermarking metadata WM and this flag is processed first in order to know, depending on its state (0/1), whether the relevant scrambled sample 15' has to be watermarked or not.

The second flag F2 is used for controlling the watermarking of a plurality of descrambled samples 15', for instance in order to know whether the entire media content 1 has to be watermarked or not. Accordingly, the second flag F2 is comprised in the key metadata KcM processed by the cryptographic unit 33 so that the activation of the watermarking is linked to data relating to the content key Kc. Besides, the state of the second flag F2 controls the consideration of the first flag F1 and the achievement of the authentication step. Indeed, in the case where the second flag F2 indicates that no watermarking is required, e.g. for all the descrambled samples 15' of a media content stream, then the authentication step will be bypassed (until a new instruction is provided through the second flag F2) and preferably the decryption of the watermarking metadata WM will not be performed (because it is unnecessary). Accordingly, the second flag F2 provides an indication whether the stream of samples has to be watermarked or not. Given that this second flag F2 is included in the key metadata KcM, therefore the key metadata KcM will be decrypted and read before the decryption of the watermarking metadata WM. In the case where the second flag F2 indicates that the samples have to be watermarked, then the state of the first flag F1 is taken into account as a subordinate condition. Thus, although the second flag F2 indicates that the stream has to be watermarked, some individual samples of this stream may remain without watermark in the case where the first flag F1 occasionally indicates that no watermarking is requested for certain samples.

The flags F1, F2 are preferably processed by the central processing unit 32, so that this CPU may decide to undertake the appropriate steps.

Owing to such flags, in particular owing to the first flag F1, it becomes possible to introduce fake watermarking metadata within the metadata 10. Such fake watermarking metadata will not be taken into account if a flag F stating that no watermarking is required is provided. Indeed, the structure of the metadata 10, in particular the structure of the watermarking metadata WM, is kept regardless metadata 10 includes true of fake watermarking metadata. Therefore, a malicious person will be unable to distinguish between true and fake watermarking metadata contrarily to the system 20 which will be informed accordingly by means of the flag.

Finally, the system 20 transmits the sample 15', 15" provided at the output of the watermarking unit 39 to the application software APP or to a secure media path for rendering purposes.

According to one embodiment, the digital media content 1 is a stream media content compliant with the ISO Base Media File Format (ISO BMFF). It could be also compliant with an HTTP-based media streaming communications protocol such as Http Live Streaming (HLS).

In accordance with a further embodiment, the secure environment 30 is controlled by a firmware Firm (i.e. a microcode or a program code) implemented into a processing unit 32 (e.g. a CPU) within the secure environment. Accordingly, the secure environment is able to work in an independent manner once it has received the metadata 10.

Whatever the embodiment, the firmware can be downloadable or upgradeable through the application software APP. However, in the case where the firmware is installed via the application software into the secure environment, e.g. in a non-volatile memory 32', in view to be run by an internal central processing unit 32 (located within the secure environment), then the firmware will be downloaded in an encrypted and signed form by the internal CPU. Accordingly, the downloaded firmware is installed only if it has been successfully authenticated by a related secret authentication process within the secure environment. Besides, the firmware Firm could be also stored outside the secure environment, for instance within the application software APP. In this case, the firmware will be stored in an encrypted form and will be decrypted by the secure environment only.

As already mentioned, the present invention also refers to a system for implementing the above-described method. To this end, the invention also refers to a system 20 for watermarking digital media content 1 supplied in an encrypted form (more particularly at least partially encrypted) as described in reference to FIG. 1.

As shown in the attached figures, especially in FIG. 3, the system 20 comprises a computing unit 25 for running the application APP into which the digital media content 1 is input (through the first interface 21) in a form of at least one encrypted sample 15 (whose size is defined e.g. by size information SZ). The digital media content comprises the same data as already explained in reference to the method and the media content is also related to metadata 10. For the sake of simplicity and as already mentioned in reference to the method, one considers that the metadata 10 relating to a sample 15 are comprised in the same packet and that the metadata 10 and the samples 15 are arranged in the media content 1 as illustrated in FIG. 1.

According to the invention, the system further comprises a secure environment 30 communicating with the application software APP through the second interface 22.

The secure environment in turn comprises the following components:
- the secure memory 35 for storing at least one transport key KT, KT; said transport key(s) can be derived from a secret key Ks stored in the secure memory 35, as explained in reference to the above method, the cryptographic unit 33 for decrypting the so-called first data 11 (see FIG. 2) by means of the transport key(s) KT, KT', the authentication unit 31 for authenticating the signed first and second data 11, 12, the descrambler 37 for descrambling each encrypted sample 15, (retrieved e.g. thanks to the size information SZ), by means of a sample key Kc' corresponding to the pair of cryptographic data Kc, IV used as input data in a cryptographic process within the cryptographic unit 33, the watermarking unit 39 for digitally marking each descrambled sample 15' by means of watermarking metadata WM comprised in the first data 11.

In addition, the application software APP comprised in the system 20 is also configured to extract metadata 10 from the digital media content 1 or from another source (e.g. a playlist) before transmitting the extracted metadata 10 to the secure environment 30 for processing. The second interface 22 is further used for outputting the descrambled sample 15', 15" (i.e. either a descrambled sample 15' without watermark or a watermarked descrambled sample 15") from the secure environment 30 in view to be played by a rendering device.

The second interface 22 can refer to a protocol intended to be used as an interface software components, such as Application Programming Interface (API), and allowing two programs (or software, firmware, etc . . . ) to communicate with each other.

Preferably, the secure memory 35 further comprises a unique identification watermark $W_{ID}$ to be transmitted to the marking unit 35 (either upon request from this unit 35, or by order of the cryptographic unit 33) for adding a unique identification mark during watermarking of the sample. Accordingly, the watermarked sample 15" can comprise at least two distinct watermarks, namely the watermark provided by the watermarking metadata WM and the identification watermark $W_{ID}$ specific to the secure environment 30 (the same is applicable for the above method).

According to a preferred embodiment, the secure environment 30 comprises a central processing unit 32 and a non volatile memory 32' into which the firmware Firm is implemented for controlling all components (circuits, logical units, memory, etc . . . ) of the secure environment. Thus, the secure environment acts as a secure master processing unit.

In variant, the secure environment 30 could be devoid of any central processing unit (such as the CPU 32 running a firmware for controlling its components), but could be controlled by the application software APP as a secure processing slave unit, namely without any possibility for the application software APP to have access to any sensitive data. Accordingly, sensitive data (such as decrypted data) is always processed by the secure environment only.

Preferably, the secure environment 30 is made of a monolithic chipset. Besides, this secure environment or this monolithic chipset can be accommodated by a smartcard.

In another embodiment, the descrambler 37 and the watermarking unit 39 could be physically separated from the secure embodiment, while remaining physically connected to the latter.

Thanks to the present invention, the watermarking of the samples 15 is enforced by cryptographically binding the watermarking metadata WM with the content protection right (namely the content key Kc and related key metadata KcM if any) and with the initialization vector IV used to decrypt the content (samples). Only the secure environment is able to retrieve the content key Kc and the watermarking metadata WM to decrypt and mark the digital media content.

Even if the application software APP has access to this data (IV, WM), it could not exploit them to understand/modify how the WM process works.

The invention claimed is:

1. A method for watermarking digital media content, the method comprising:

receiving the digital media content through a first interface by an application software, the digital media content being in a form of at least one encrypted sample, said digital media content being related to metadata assigned to each sample;

said sample being encrypted by means of a sample key;

said metadata comprising first data, second data and a digital signature resulting from the signature of said first and second data, the first data comprising at least a content key and watermarking metadata and at least said first data being encrypted by at least one transport key, the content key being used as first input in a cryptographic process;

the second data comprising at least an initialization vector used as second input in said cryptographic process so that the content key and the initialization vector allow to retrieve the sample key for encrypting/decrypting each sample of said digital media content;

said application software communicating through a second interface with a secure environment in charge of handling said metadata; and said secure environment being able either to extract the transport key from a secure memory or to derive said transport key from a secret key stored in said secure memory;

instructing the application software to get said metadata and to transmit it to the secure environment;

decrypting said first data within the secure environment by means of the transport key to retrieve at least the content key in an intelligible form;

verifying the authenticity of said digitally signed first and second data;

transmitting, in response to a successful verification of the authentication of said digitally signed first and second data, the watermarking metadata to a watermarking unit and transmitting the digital media content, the content key and the initialization vector to a descrambler for descrambling each sample by means of the sample key;

transmitting each descrambled sample to the watermarking unit for digitally marking each descrambled sample by means of at least said watermarking metadata; and transmitting the sample from the watermarking unit to the application software or to a secure media path for rendering purposes.

2. The method of claim 1, further comprising taking countermeasures in response to a failed verification of the authentication of said digitally signed first and second data.

3. The method of claim 1, wherein the watermarking unit further digitally marks the sample with an identification watermark specific to said secure environment to uniquely identify it, said identification watermark being extracted from said secure memory.

4. The method of claim 1, wherein said metadata further comprises at least one flag which can have two states, the achievement of the watermarking of the scrambled sample depending on the state of said flag.

5. The method of claim 4, wherein said metadata comprises a first flag for controlling the watermarking of each scrambled sample and a second flag, comprised in key metadata within said first data, for controlling the watermarking of a plurality of samples, the state of the second flag controlling the consideration of the first flag and the achievement of said authentication step.

6. The method of claim 2, wherein if the authentication step provides a negative outcome, then the descrambler stops any descrambling process for at least one cryptoperiod, as countermeasures.

7. The method of claim 1, wherein at least the content key is encrypted with the transport key and the watermarking metadata are encrypted with a second transport key distinct from the transport key.

8. The method of claim 1, wherein said digital media content is a stream media content compliant with an ISO Base Media File Format and/or said cryptographic process refers to Advanced Encryption Standard process.

9. The method of claim 1, wherein the step aiming to instruct the application software to get said metadata and to transmit it to the secure environment is performed by modifying an application layer within a standard application software.

10. The method of claim 1, wherein the secure environment is controlled by a firmware implemented into a central processing unit within the secure environment.

11. A system for watermarking digital media content, comprising:
   a computing unit configured to run application software into which said digital media content is input, through a first interface, in a form of at least one encrypted sample, the at least one encrypted sample being encrypted by means of a sample key, said digital media content being related to metadata assigned to each sample and said metadata comprising first data, second data and a digital signature resulting from the signature of said first and second data, the first data comprising at least a content key and watermarking metadata and the second data comprising at least an initialization vector, at least said first data being encrypted by at least one transport key;
   a secure environment configured to communicate with the application software through a second interface, said secure environment including the following components:
      a secure memory for storing at least one transport key or at least a secret key used for retrieving said transport key;
      a cryptographic unit for decrypting said first data by means of said at least one transport key;
      an authentication unit for authenticating the signed first and second data;
      a descrambler for descrambling each sample, by means of the content key and the initialization vector;
      a watermarking unit able to digitally mark each descrambled sample with at least watermarking metadata comprised in said first data;
   wherein said application software is configured to extract said metadata from the digital media content or from another source before transmitting the metadata to the secure environment for processing, said second interface being further used for outputting the descrambled sample from the secure environment in view to be played by a rendering device.

12. The system of claim 11, wherein the secure memory further comprises a unique identification watermark to be transmitted to the marking unit for adding a unique identification mark, belonging to the secure environment, during watermarking of the descrambled sample.

13. The system of claim 11, wherein said secure environment comprises a central processing unit and a non-volatile memory into which a firmware is implemented for controlling all components of the secure environment as a secure master processing unit.

14. The system of claim 11, wherein said secure environment is devoid of any central processing unit running a firmware for controlling its components, but is controlled by the application software as a secure processing slave unit.

15. The system of claim 11, wherein said secure environment is a monolithic chipset.

16. The system of claim 11, wherein said secure environment is a smartcard.

* * * * *